US012643516B2

(12) United States Patent
Yoo

(10) Patent No.: US 12,643,516 B2
(45) Date of Patent: Jun. 2, 2026

(54) ELECTRO MECHANICAL BRAKE SYSTEM AND CONTROL METHOD THEREOF

(71) Applicant: HL MANDO CORPORATION, Pyeongtaek-si (KR)

(72) Inventor: Hyeokki Yoo, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 122 days.

(21) Appl. No.: 18/626,874

(22) Filed: Apr. 4, 2024

(65) Prior Publication Data

US 2025/0065855 A1    Feb. 27, 2025

(30) Foreign Application Priority Data

Aug. 21, 2023    (KR) ........................ 10-2023-0109058

(51) Int. Cl.
| | |
|---|---|
| *B60T 8/88* | (2006.01) |
| *B60T 8/171* | (2006.01) |

(Continued)

(52) U.S. Cl.
CPC .............. *B60T 8/885* (2013.01); *B60T 8/171* (2013.01); *B60T 8/58* (2013.01); *B60T 8/96* (2013.01);

(Continued)

(58) Field of Classification Search
CPC . B60T 8/885; B60T 8/171; B60T 8/58; B60T 8/96; B60T 2220/04;

(Continued)

(56) References Cited

U.S. PATENT DOCUMENTS

| | | | | |
|---|---|---|---|---|
| 2011/0276245 A1* | 11/2011 | Krueger | .............. | B60T 8/17616 |
| | | | | 701/71 |
| 2023/0051407 A1* | 2/2023 | Kim | ........................ | B60T 8/885 |

FOREIGN PATENT DOCUMENTS

| | | |
|---|---|---|
| JP | 2023-13796 A | 1/2023 |
| KR | 10-1410915 B1 | 6/2014 |

(Continued)

OTHER PUBLICATIONS

Office Action issued on Jan. 16, 2026 for corresponding Korean Patent Application No. 10-2023-0109058, along with an English translation (16 pages).

*Primary Examiner* — Long T Tran
*Assistant Examiner* — Charles J Brauch
(74) *Attorney, Agent, or Firm* — Hauptman Ham, LLP

(57) ABSTRACT

Disclosed is electro mechanical brake system including: first pedal sensor, second pedal sensor, and third pedal sensor configured to detect pedal effort applied to brake pedal and generate first braking signal, second braking signal, and third braking signal; first EMB, second EMB, third EMB, and fourth EMB respectively installed in plurality of wheels of vehicle and configured to provide braking force to plurality of wheels of vehicle; first brake controller connected to first pedal sensor, and configured to obtain first target braking torque based on first braking signal and transmit first target braking torque to first, second, third and fourth EMBs; and second brake controller connected to first pedal sensor, second pedal sensor, and third pedal sensor, and configured to obtain second target braking torque based on first braking signal, second braking signal, and third braking signal and transmit second target braking torque to first, second, third and fourth EMBs.

19 Claims, 9 Drawing Sheets

(51) Int. Cl.
   *B60T 8/58*        (2006.01)
   *B60T 8/96*        (2006.01)

(52) U.S. Cl.
   CPC ....... *B60T 2220/04* (2013.01); *B60T 2270/10* (2013.01); *B60T 2270/20* (2013.01); *B60T 2270/30* (2013.01); *B60T 2270/402* (2013.01); *B60T 2270/404* (2013.01); *B60T 2270/406* (2013.01); *B60T 2270/413* (2013.01); *B60T 2270/414* (2013.01); *B60T 2270/416* (2013.01)

(58) Field of Classification Search
   CPC ............. B60T 2270/10; B60T 2270/20; B60T 2270/30; B60T 2270/402; B60T 2270/404; B60T 2270/406; B60T 2270/413; B60T 2270/414; B60T 2270/416; B60T 17/221; B60T 7/042; B60T 13/746; B60R 16/033; B60Y 2306/13; B60Y 2306/15; B60Y 2400/81
   See application file for complete search history.

(56) References Cited

FOREIGN PATENT DOCUMENTS

| | | | |
|---|---|---|---|
| KR | 10-2021-0147487 | A | 12/2021 |
| KR | 10-2399337 | B1 | 5/2022 |
| KR | 10-2023-0024141 | A | 2/2023 |
| WO | 2015/181032 | A2 | 3/2015 |

* cited by examiner

FIG. 8

ELECTRO MECHANICAL BRAKE SYSTEM AND CONTROL METHOD THEREOF

CROSS-REFERENCE TO RELATED APPLICATION(S)

This application is based on and claims priority under 35 U.S.C. § 119 to Korean Patent Application No. 10-2023-0109058, filed on Aug. 21, 2023, in the Korean Intellectual Property Office, the disclosure of which is incorporated by reference herein in its entirety.

BACKGROUND

1. Field

The disclosure relates to an electro mechanical brake system that is applicable to an autonomous vehicle by ensuring a minimum braking control even in a failure situation of some components, and a control method thereof.

2. Description of the Related Art

With the advancement of automobile technology, the development and requirements of autonomous driving technology are becoming more specific. Above all, one of the important issues in autonomous driving technology is ensuring safety. When a vehicle itself drives instead of people, safety should be ensured while the vehicle is driving, and accordingly, the safety standards applied to autonomous vehicles should be at very high levels.

In relation to this, the performance of the brake system applied to the autonomous vehicles should not only be good, but also should be able to perform a braking control without any problems even when a failure occurs in any one of components constituting the brake system. To this end, existing automobile manufacturers ensure safety by providing redundancy to the components of the electro mechanical braking system applied to autonomous vehicles.

However, providing redundancy to the electro mechanical braking system causes disadvantages, such as complexity, an increase of weight, and high cost, due to added parts.

SUMMARY

It is an aspect of the disclosure to provide an electro mechanical brake system capable of ensuring minimum braking performance even in a failure situation of some components in a brake system, and a control method thereof.

Additional aspects of the disclosure will be set forth in part in the description which follows and, in part, will be obvious from the description, or may be learned by practice of the disclosure.

In accordance with an aspect of the disclosure, an electro mechanical brake system may include: a first pedal sensor, a second pedal sensor, and a third pedal sensor configured to detect a pedal effort applied to a brake pedal and generate a first braking signal, a second braking signal, and a third braking signal; a first Electro Mechanical Brake (EMB), a second EMB, a third EMB, and a fourth EMB respectively installed in a plurality of wheels of a vehicle and configured to provide a braking force to the plurality of wheels of the vehicle; a first brake controller connected to the first pedal sensor, and configured to obtain a first target braking torque based on the first braking signal and transmit the first target braking torque to the first EMB, the second EMB, the third EMB, and the fourth EMB; and a second brake controller connected to the first pedal sensor, the second pedal sensor, and the third pedal sensor, and configured to obtain a second target braking torque based on the first braking signal, the second braking signal, and the third braking signal and transmit the second target braking torque to the first EMB, the second EMB, the third EMB, and the fourth EMB, wherein the second brake controller may be configured to detect a failure of at least one of the first pedal sensor, the second pedal sensor, or the third pedal sensor based on the first braking signal, the second braking signal, and the third braking signal.

Based on a failure of one brake controller of the first brake controller or the second brake controller, another brake controller not failed may transmit the first target braking torque or the second target braking torque to the first EMB, the second EMB, the third EMB, and the fourth EMB.

The first pedal sensor, the first brake controller, the first EMB, and the fourth EMB may be powered from a first battery of the vehicle. The second pedal sensor, the third pedal sensor, the second brake controller, the second EMB, and the third EMB may be powered from a second battery of the vehicle.

Based on a failure of the first battery, the second brake controller may obtain the second target braking torque based on the first braking signal, the second braking signal, and the third braking signal and transmit the second target braking torque to the second EMB and the third EMB.

Based on a failure of the second battery, the second brake controller may obtain the first target braking torque based on the first braking signal and transmit the first target braking torque to the first EMB and the fourth EMB.

The first EMB, the second EMB, the third EMB, and the fourth EMB may detect failures of a plurality of wheel speed sensors respectively installed in the plurality of wheels of the vehicle.

The first EMB, the second EMB, the third EMB, and the fourth EMB may receive a wheel speed signal from the plurality of wheel speed sensors respectively installed in the plurality of wheels of the vehicle and transmit the wheel speed signal to the first brake controller and the second brake controller.

The first brake controller may obtain the first target braking torque based on the first braking signal and the wheel speed signal. The second brake controller may obtain the second target braking torque based on the first braking signal, the second braking signal, the third braking signal, and the wheel speed signal.

The first brake controller may be connected to an Electronic Controlled Unit (ECU) in the vehicle through a communication network, and may perform at least one control of Anti-lock Braking System (ABS) control, Electronic Stability Control (ESC) control, or Traction Control System (TCS) control.

The first brake controller and the second brake controller may be connected to a first local network. The second brake controller may obtain, upon a detection of a failure of the first pedal sensor, the second target braking torque based on the second braking signal and the third braking signal.

The second brake controller may transmit the second target braking torque to the first brake controller.

The second brake controller may transmit the second target braking torque to the first EMB, the second EMB, the third EMB, and the fourth EMB.

The second brake controller may transmit a failure signal of the second pedal sensor to the first brake controller. The first brake controller may not obtain the first target braking torque based on reception of the failure signal.

The first brake controller may transmit the second target braking torque to the first EMB, the second EMB, the third EMB, and the fourth EMB, based on reception of the second target braking torque.

Upon reception of both the first target braking torque and the second target braking torque, the first EMB, the second EMB, the third EMB, and the fourth EMB may perform a braking control based on the first target braking torque.

In accordance with an aspect of the disclosure, a method of controlling an electro mechanical brake system of a vehicle including: a first pedal sensor, a second pedal sensor, a third pedal sensor, a first brake controller, a second brake controller, a first Electro Mechanical Brake (EMB), a second EMB, a third EMB, and a fourth EMB, wherein the first pedal sensor, the first brake controller, the first EMB, and the fourth EMB powered from a first battery of the vehicle and the second pedal sensor, the third pedal sensor, the second brake controller, the second EMB, and the third EMB are powered from a second battery of the vehicle, may include, at the first pedal sensor, detecting the second pedal sensor, and the third pedal sensor, a pedal effort applied to a brake pedal; at the first pedal sensor, generating the second pedal sensor, and the third pedal sensor, a first braking signal, a second braking signal, and a third braking signal; at the first brake controller connected to the first pedal sensor, obtaining a first target braking torque based on the first braking signal; at the first brake controller transmitting the first target braking torque to the first EMB, the second EMB, the third EMB, and the fourth EMB; at the second brake controller connected to the first pedal sensor, the second pedal sensor, and the third pedal sensor, obtaining a second target braking torque based on the first braking signal, the second braking signal, and the third braking signal; at the second brake controller, transmitting the second target braking torque to the first EMB, the second EMB, the third EMB, and the fourth EMB; at the first EMB, the second EMB, the third EMB, and the fourth EMB, performing a braking control based on the first target braking torque upon reception of both the first target braking torque and the second target braking torque; detecting a failure of at least one of the first battery, the second battery, the first pedal sensor, the second pedal sensor, the third pedal sensor, the first brake controller, or the second brake controller; and at any one brake controller of the first brake controller or the second brake controller, performing a braking control based on the detected failure.

The performing of the braking control based on the detected failure may include at the second brake controller, obtaining the second target braking torque based on the first braking signal, the second braking signal, and the third braking signal; and at the second brake controller, transmitting the second target braking torque to the second EMB and the third EMB.

The performing of the braking control based on the detected failure may include at the first brake controller, obtaining the first target braking torque based on the first braking signal; and at the first brake controller, transmitting the first target braking torque to the first EMB and the fourth EMB.

The performing of the braking control obtaining may include at the second brake controller, transmitting a failure signal of the first pedal sensor to the first brake controller; at the second brake controller, obtaining the second target braking torque based on the second braking signal and the third braking signal; and at the second brake controller, transmitting the second target braking torque to the first brake controller or transmitting the second target braking torque to the first EMB, the second EMB, the third EMB, and the fourth EMB.

The method may further include, at the first brake controller, transmitting, upon reception of the second target braking torque, the second target braking torque to the first EMB, the second EMB, the third EMB, and the fourth EMB.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 8 is flowchart illustrating a method of controlling an electro mechanical brake system according to an embodiment.

DETAILED DESCRIPTION

Figure 1:
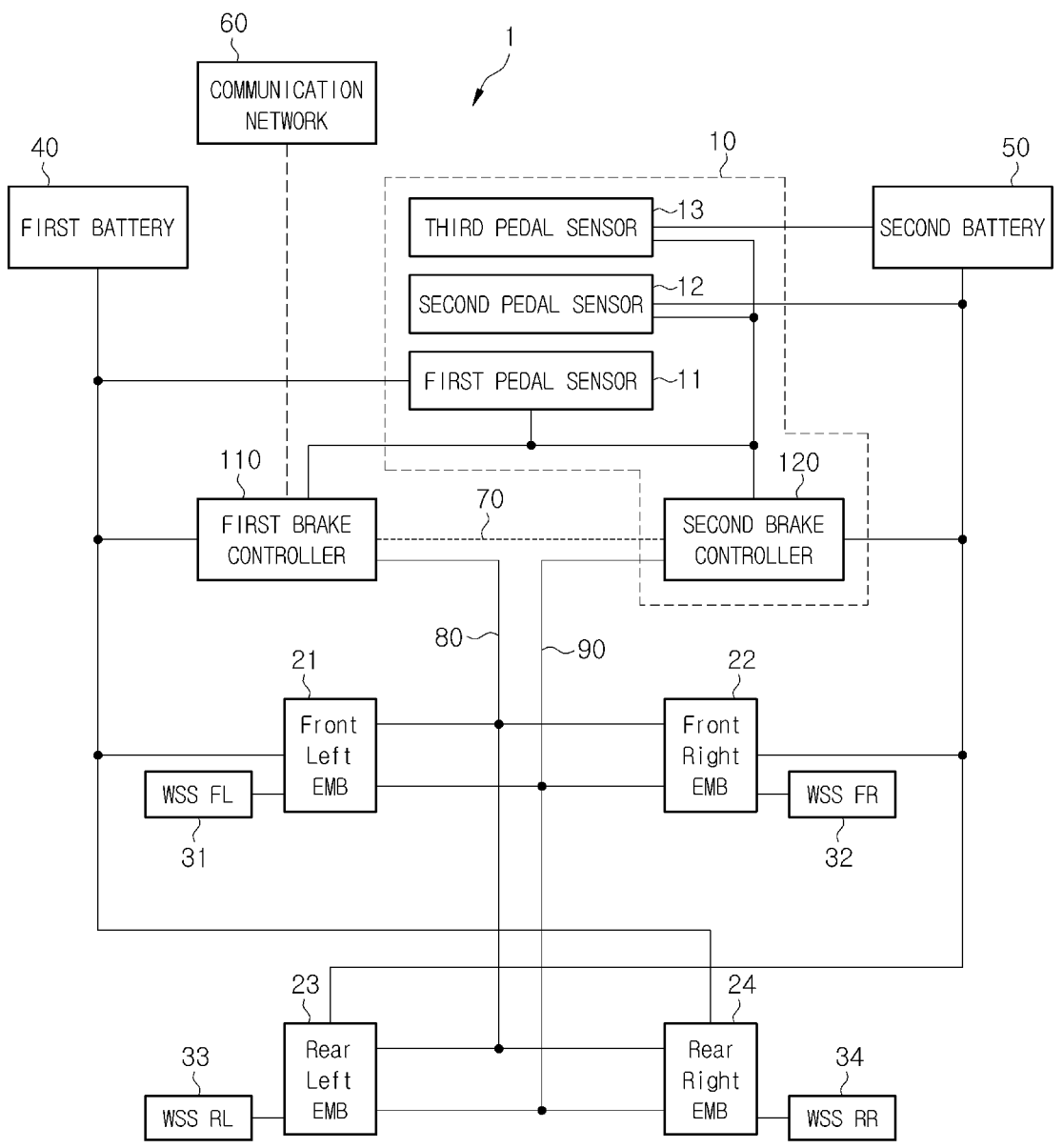
FIG. 1 schematically shows a configuration of an electro mechanical brake system according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

Figure 2:
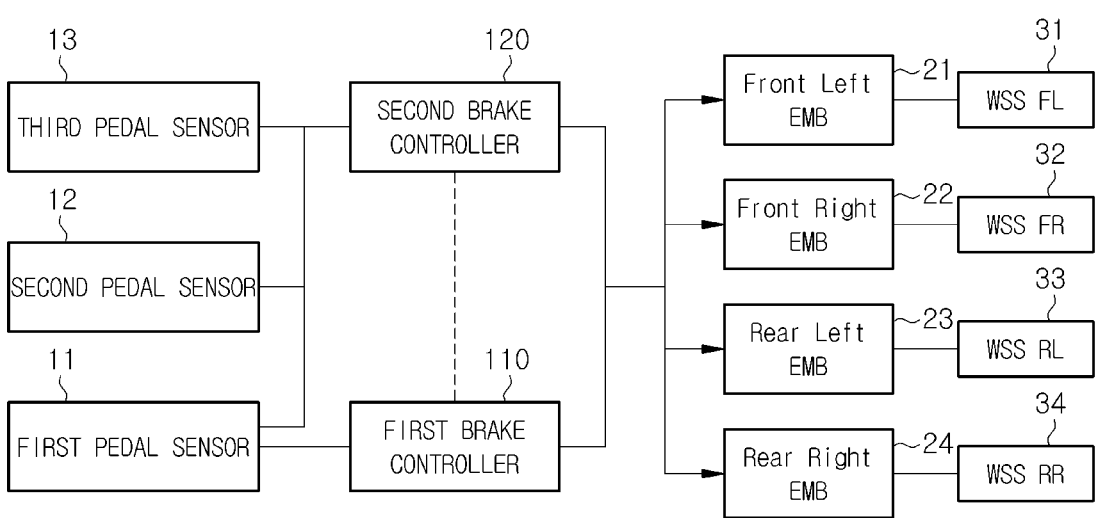
FIG. 2 is a block diagram showing a part of an electro mechanical brake system according to an embodiment.

FIG. 1 schematically shows a configuration of an electro mechanical brake system 1 according to an embodiment, and FIG. 2 is a block diagram showing a part of the electro mechanical brake system 1 according to an embodiment.

Referring to FIGS. 1 and 2, the electro mechanical brake system 1 may include a brake pedal unit 10, a first Electro Mechanical Brake (EMB) 21, a second EMB 22, a third EMB 23, a fourth EMB 24, a first wheel speed sensor 31, a second wheel speed sensor 32, a third wheel speed sensor 33, a fourth wheel speed sensor 34, a first battery 40, a second battery 50, a communication network 60, a first local network 70, a second local network 80, a third local network 90, and a first brake controller 110.

The brake pedal unit 10 may include a first pedal sensor 11, a second pedal sensor 12, a third pedal sensor 13, and a second brake controller 120.

The first pedal sensor 11, the second pedal sensor 12, and the third pedal sensor 13 may detect a pedal effort applied to a brake pedal to generate a first brake signal, a second brake signal, and a third brake signal. Each of the first pedal sensor 11, the second pedal sensor 12, and the third pedal sensor 13 may be a Pedal Travel Sensor (PTS). The PTS may detect information about how deeply a driver has pressed the brake pedal, that is, a pedal effort and generate a braking signal corresponding to the pedal effort.

The second brake controller 120 may constitute the brake pedal unit 10 together with the first pedal sensor 11, the second pedal sensor 12, and the third pedal sensor 13. The second brake controller 120 may obtain a second target braking torque based on a first braking signal, a second braking signal, and a third braking signal generated by the first pedal sensor 11, the second pedal sensor 12, and the third pedal sensor 13. More specifically, the second brake controller 120 may obtain a second target braking torque based on the first braking signal, the second braking signal, the third braking signal, and wheel speed signals received from the first EMB 21, the second EMB 22, the third EMB 23, and the fourth EMB 24. The second brake controller 120 may transmit the second target braking torque to the first EMB 21, the second EMB 22, the third EMB 23, and the fourth EMB 24.

Also, the second brake controller 120 may detect a failure of at least one of the first pedal sensor 11, the second pedal sensor 12, or the third pedal sensor 13 based on a first braking signal, a second braking signal, and a third braking signal. Detecting a failure of at least one of the first pedal sensor 11, the second pedal sensor 12, or the third pedal sensor 13 may be embodied by comparing the first braking signal, the second braking signal, and the third braking signal with each other.

As such, the second brake controller 120 may constitute the brake pedal unit 10 together with the first pedal sensor 11, the second pedal sensor 12, and the third pedal sensor 13, and detect a failure of the first pedal sensor 11, the second pedal sensor 12, or the third pedal sensor 13, or obtain a second target braking torque and transmit the second target braking torque to the first EMB 21, the second EMB 22, the third EMB 23, and the fourth EMB 24.

The first pedal sensor 11, the second pedal sensor 12, and the third pedal sensor 13 may be connected to the second brake controller 120 through a wire. Also, the first pedal sensor 11 may be connected to the first brake controller 110 through a wire.

The first EMB 21, the second EMB 22, the third EMB 23, and the fourth EMB 24 may be respectively installed in wheels of a vehicle to provide a braking force. The first EMB 21 may be a Front Left EMB, the second EMB 22 may be a Front Right EMB, the third EMB 23 may be a Rear Left EMB, and the fourth EMB 24 may be a Rear Right EMB.

An EMB may provide braking pressure to each wheel by using power of an electric motor, unlike an existing hydraulic brake. The EMB may perform various braking controls required for autonomous vehicles or intelligent constant-speed driving devices, such as Anti-lock Braking System (ABS) control, Electronic Stability Control (ESC) control and Traction Control System (TCS) control, in addition to normal braking control. To this end, the first EMB 21, the second EMB 22, the third EMB 23, and the fourth EMB 24 may include EMB controllers (not shown), respectively. The EMB controllers of the first EMB 21, the second EMB 22, the third EMB 23, and the fourth EMB 24 may respectively detect whether the first wheel speed sensor 31, the second wheel speed sensor 32, the third wheel speed sensor 33, and the fourth wheel speed sensor 34 have failed.

Also, the EMB controllers of the first EMB 21, the second EMB 22, the third EMB 23, and the fourth EMB 24 may respectively transmit wheel speed signals received from the first wheel speed sensor 31, the second wheel speed sensor 32, the third wheel speed sensor 33, and the fourth wheel speed sensor 34 to the first brake controller 110 and the second brake controller 120.

The first EMB 21, the second EMB 22, the third EMB 23, and the fourth EMB 24 may receive a first target braking torque and/or a second target braking torque from the first brake controller 110 and the second brake controller 120. Also, the first EMB 21, the second EMB 22, the third EMB 23, and the fourth EMB 24 may perform braking controls on the respective wheels based on the first target braking torque and/or the second target braking torque.

When the first EMB 21, the second EMB 22, the third EMB 23, and the fourth EMB 24 receive both a first target braking torque and a second target braking torque, the first EMB 21, the second EMB 22, the third EMB 23, and the fourth EMB 24 may perform braking controls based on the first target braking torque. That is, while both the first brake controller 110 and the second brake controller 120 operate normally, the first brake controller 110 may function as a main brake controller. The reason may be because the first brake controller 110 is connected to an Electronic Control Unit (ECU) in the vehicle through the communication network 60 to perform additional control functions, such as ABS control, ESC control, and TCS control. The communication network 60 may be a Chassis Controller Area Network (CAN) or a Vehicle Control Unit (VCU) CAN.

The first brake controller 110 may require various logics to perform the additional control functions, such as ABS, ESC, and TCS, in cooperation with the ECU in the vehicle, and accordingly, the first brake controller 110 may include a relatively complicated circuit configuration compared to the second brake controller 120. However, the disclosure is not limited to this, and according to a design, the second brake controller 120 may also be connected to the ECU in the vehicle through the communication network 60 and include a circuit configuration having high complexity by including logics to perform the additional control functions, such as ABS control, ESC control, and TCS control.

The first brake controller 110 may obtain a first target braking torque based on a first braking signal received from the first pedal sensor 11. More specifically, the first brake controller 110 may obtain a first target braking torque based on the first braking signal and wheel speed signals received from the first EMB 21, the second EMB 22, the third EMB 23, and the fourth EMB 24. The first brake controller 110 may transmit the first target braking torque to the first EMB 21, the second EMB 22, the third EMB 23, and the fourth EMB 24.

In a normal situation in which no problem occurs in the electro mechanical brake system 10, the second brake controller 120 among the first brake controller 110 and the second brake controller 120 may function as a main controller to obtain a target braking torque (second target braking torque) and transmit the target braking torque to the four EMBs, and at this time, the first brake controller 110 may perform additional controls, such as ABS, TCS, and ESC.

Because the second brake controller 120 obtains a second target braking torque based on a first braking signal, a second braking signal, and a third braking signal from the first pedal sensor 11, the second pedal sensor 12, and the third pedal sensor 13, the second brake controller 120 may obtain a more precise target braking torque than the first brake controller 110 and perform fail-over with respect to a failure of at least any pedal sensor.

The communication network 60 may connect the first brake controller 110 to the ECU in the vehicle. Also, the first local network 70 may connect the first brake controller 110 to the second brake controller 120.

The first brake controller 110 may be connected to the first EMB 21, the second EMB 22, the third EMB 23, and the fourth EMB 24 through the second local network 80 to receive and transmit a first target braking torque and wheel speed signals. The second brake controller 120 may be connected to the first EMB 21, the second EMB 22, the third EMB 23, and the fourth EMB 24 through the third local network 90 to receive and transmit a second target braking torque and wheel speed signals.

The communication network 60, the first local network 70, the second local network 80, and the third local network 90 may be communication networks NT for vehicle. For example, the first brake controller 110, the second brake controller 120, the first EMB 21, the second EMB 22, the third EMB 23, and the fourth EMB 24 may receive and transmit signals or data through the Ethernet, Media Oriented Systems Transport (MOST), Flexray, Controller Area Network (CAN), Local Interconnect Network (LIN), etc. More preferably, the first local network 70, the second local network 80, and the third local network 90 may be configured with CAN or Flexray. Also, more preferably, the communication network 60 may be configured with a Chassis CAN or VCU CAN to relay communications between the first brake controller 110 and the ECU in the vehicle.

The first battery 40 may be connected to the first pedal sensor 11, the first brake controller 110, the first EMB 21, and the fourth EMB 24 to supply power. The second battery 50 may be connected to the second pedal sensor 12, the third pedal sensor 13, the second brake controller 120, the second EMB 22, and the third EMB 23 to supply power.

As such, by a X-Split configuration in which each of two batteries is connected to two EMBs at diagonal positions among four EMBs, a normal braking control may be possible even when any one of the two batteries has failed. Details about this will be described with reference to FIGS. 3 and 4, later.

As such, by including the first pedal sensor 11, the second pedal sensor 12, the third pedal sensor 13, the first brake controller 110, the second brake controller 120, the first battery 40, and the second battery 50, redundancy with respect to a failure or breakdown that may occur in the electro mechanical brake system 1 may be ensured.

Hereinafter, how a braking control is performed upon a failure of a specific component in the electro mechanical brake system 1 with redundancy will be described through various examples.

Referring to FIG. 1, a case in which a communication disconnection between the first brake controller 110 and the second brake controller 120 occurs will be described.

When the first local network 70 connecting the first brake controller 110 to the second brake controller 120 has failed, communication between the first brake controller 110 and the second brake controller 120 may be disconnected. In this situation, the electro mechanical brake system 1 may preferentially use the second brake controller 120 for a braking control. At this time, the first brake controller 110 may perform an abnormal braking control such as ABS.

In the electro mechanical brake system 1, the second local network 80 and the third local network 90, as well as the first local network 70, may also be subject to a failure or communication disconnection.

When a failure has occurred in the second local network 80, none of information or signals required for a braking control may be received or transmitted between the first brake controller 110 and the four EMBs. In this case, the second brake controller 120 may perform a braking control on the four EMBs.

In contrast, when a failure has occurred in the third local network 90, none of information or signals required for a braking control may be received or transmitted between the second brake controller 120 and the four EMBs. In this case, the first brake controller 110 may perform a braking control on the four EMBs.

Figure 3:
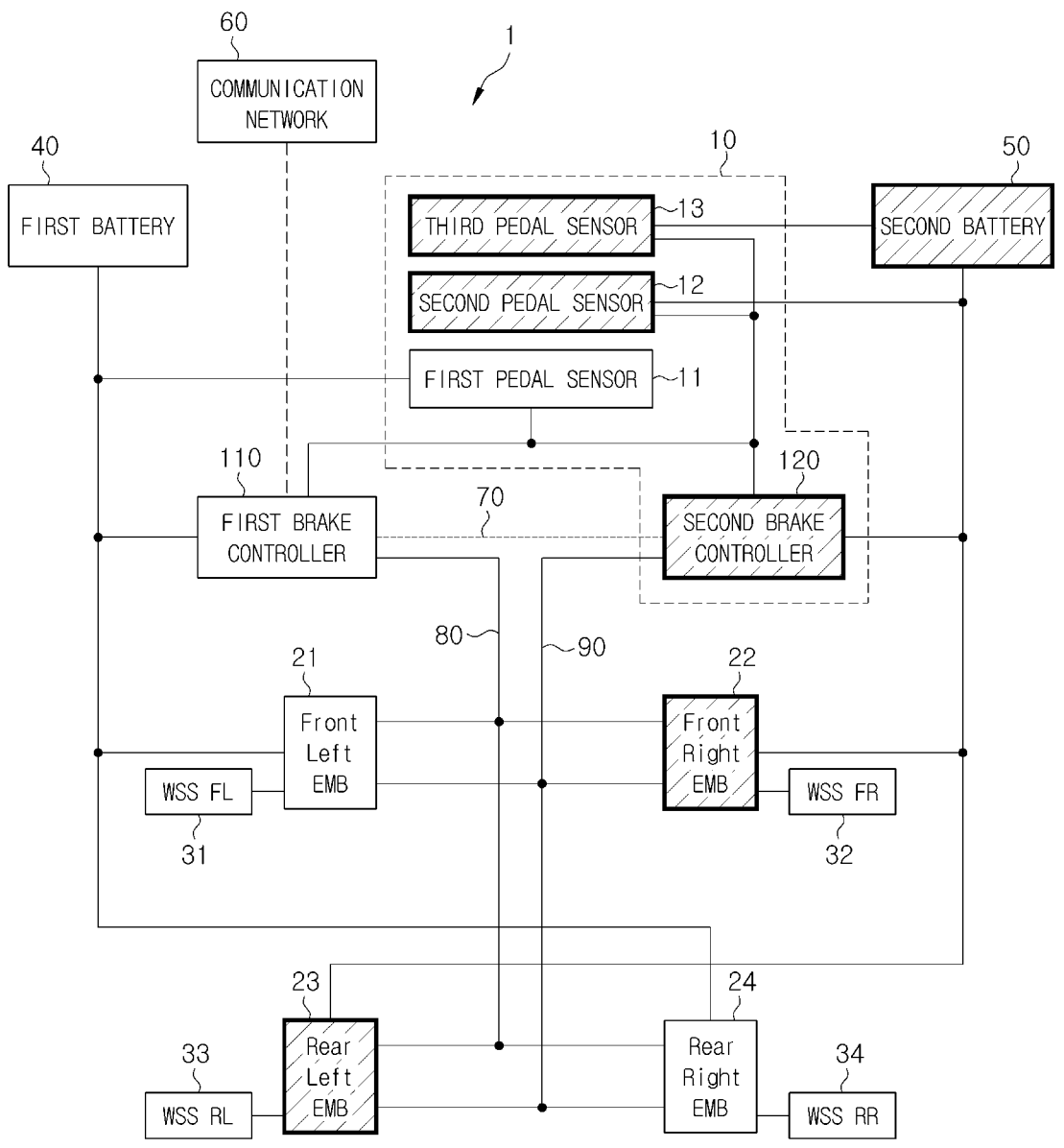
FIG. 3 shows a state in which a second battery has failed in the electro mechanical brake system of FIG. 1.

FIG. 3 shows a state in which the second battery 50 has failed in the electro mechanical brake system 1 of FIG. 1.

Referring to FIG. 3, the second battery 50 may be connected to the second pedal sensor 12, the third pedal sensor 13, the second brake controller 120, the second EMB 22, and the third EMB 23 to supply power. When the second battery 50 has failed, the second pedal sensor 12, the third pedal sensor 13, the second brake controller 120, the second EMB 22, and the third EMB 23 may be powered off and thus disabled. In this case, the first brake controller 110 may obtain a first target braking torque based on a first braking signal from the first pedal sensor 11, and transmit the first target braking torque to the first EMB 21 and the fourth EMB 24. Accordingly, even when the second battery 50 has failed, a braking control on the first EMB 21 and the fourth EMB 24 may be possible, thereby maintaining minimum braking performance required by regulatory conditions. That is, even in a failure situation of the second battery 50, one pedal sensor, one brake controller, and two EMBs may be maintained in an enabled state by the first battery 40.

Figure 4:
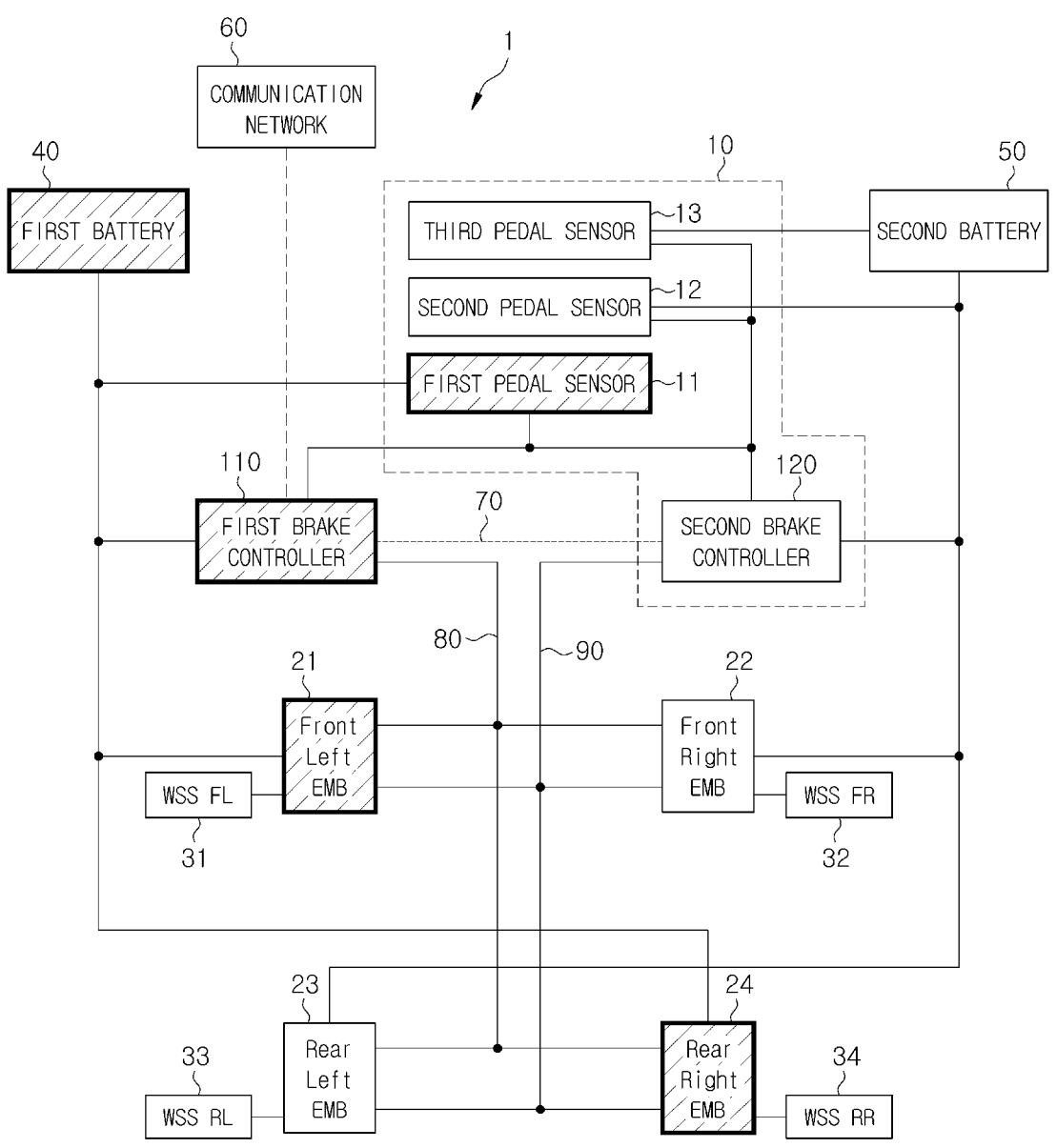
FIG. 4 shows a state in which a first battery has failed in the electro mechanical brake system of FIG. 1.

FIG. 4 shows a state in which the first battery 40 has failed in the electro mechanical brake system 1 of FIG. 1.

Referring to FIG. 4, the first battery 40 may be connected to the first pedal sensor 11, the first brake controller 110, the first EMB 21, and the fourth EMB 24 to supply power. When the first battery 40 has failed, the first pedal sensor 11, the first brake controller 110, the first EMB 21, and the fourth EMB 24 may be powered off and thus disabled. In this case, the second brake controller 120 may obtain a second target braking torque based on a second braking signal and a third braking signal from the second pedal sensor 12 and the third pedal sensor 13, and transmit the second target braking torque to the second EMB 22 and the third EMB 23. Accordingly, even when the first battery 40 has failed, a braking control on the second EMB 21 and the third EMB 23 may be possible, thereby maintaining minimum braking performance required by regulatory conditions. That is, even in a failure situation of the first battery 40, two pedal sensors, one brake controller, and two EMBs may be maintained in an enabled state by the second battery 50. Accordingly, even in a failure situation of the first battery 40, the second brake controller 120 may detect a failure of any one of the second pedal sensor 12 or the third pedal sensor 13 based on a second braking signal and a third braking signal.

Figure 5:
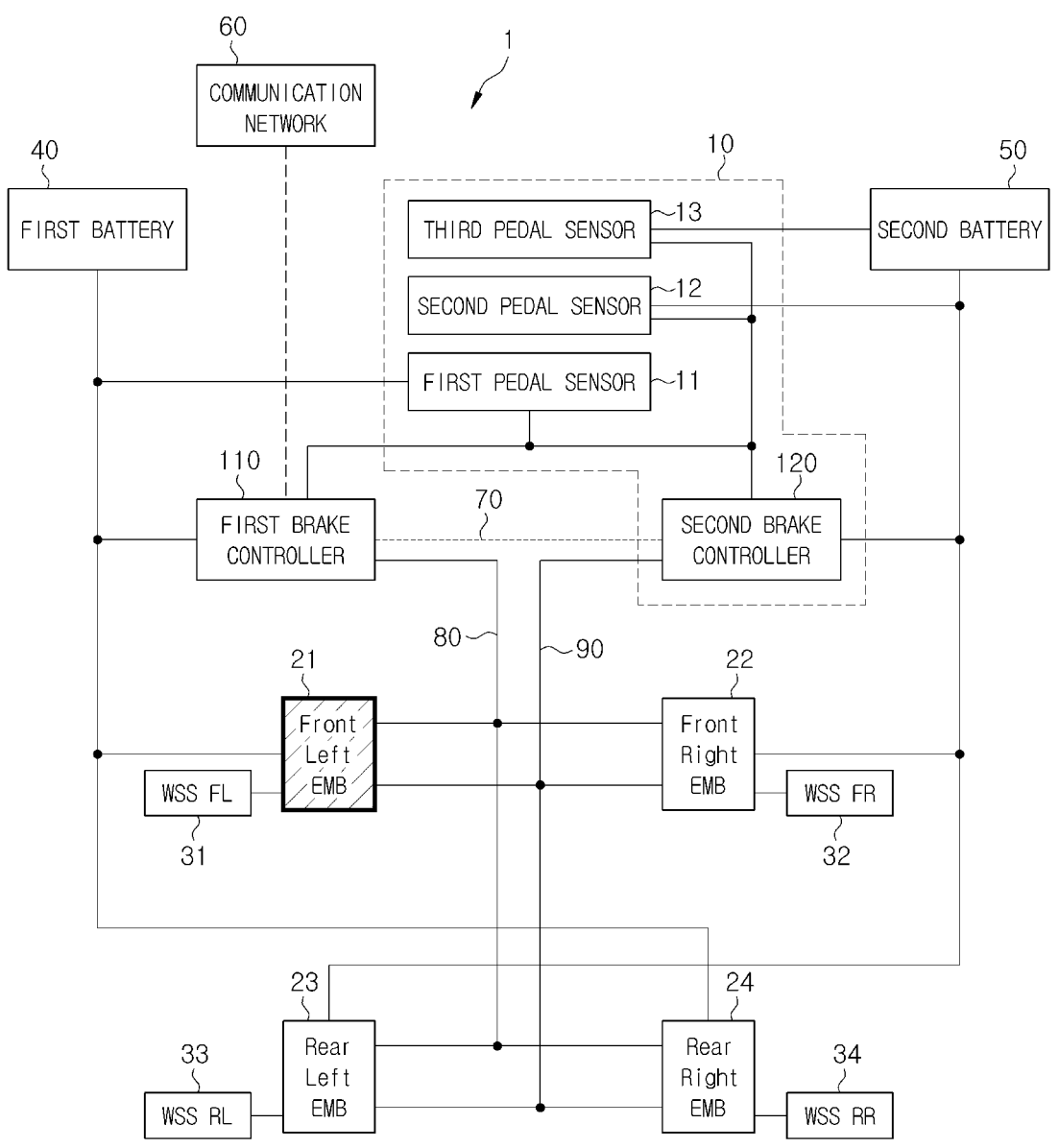
FIG. 5 shows a state in which a first electro mechanical brake has failed in the electro mechanical brake system of FIG. 1.

Meanwhile, when the first brake controller 110 becomes disabled, the second brake controller 120 may not perform additional control functions, such as ABS, ESC, and TCS, except for a normal braking control, because the second brake controller 120 is not directly connected to the ECU through the communication network 60. Accordingly, the second brake controller 120 may not require a complicated circuit configuration for performing the additional control functions, and may have a simpler configuration than the first brake controller 110. Instead, the second brake controller 120 may include a logic for detecting a failure of the first pedal sensor 11, the second pedal sensor 12, or the third pedal sensor 13, unlike the first brake controller 110. FIG. 5 shows a state in which the first EMB 21 has failed in the electro mechanical brake system of FIG. 1.

The first brake controller 110 and the second brake controller 120 may detect a failure of an EMB controller of each of the first EMB 21, the second EMB 22, the third EMB 23, and the fourth EMB 24.

Referring to FIG. 5, when the first brake controller 110 and/or the second brake controller 120 detects a failure of an EMB controller of the first EMB 21, the first brake controller 110 and/or the second braking controller 120 may perform a braking control on the second EMB 22, the third EMB 23, and the fourth EMB 24. At this time, the first brake controller 110 and/or the second braking controller 120 may compensate for a first target braking torque and/or a second target braking torque in consideration of the failure of the first EMB 21, thereby performing a normal braking control on the second EMB 22, the third EMB 23, and the fourth EMB 24.

Even in a situation in which a failure of any one of the second EMB 22, the third EMB 23, or the fourth EMB 24 is detected, the same response method as in the situation in which the first EMB 21 has failed may be applied.

Figure 6:
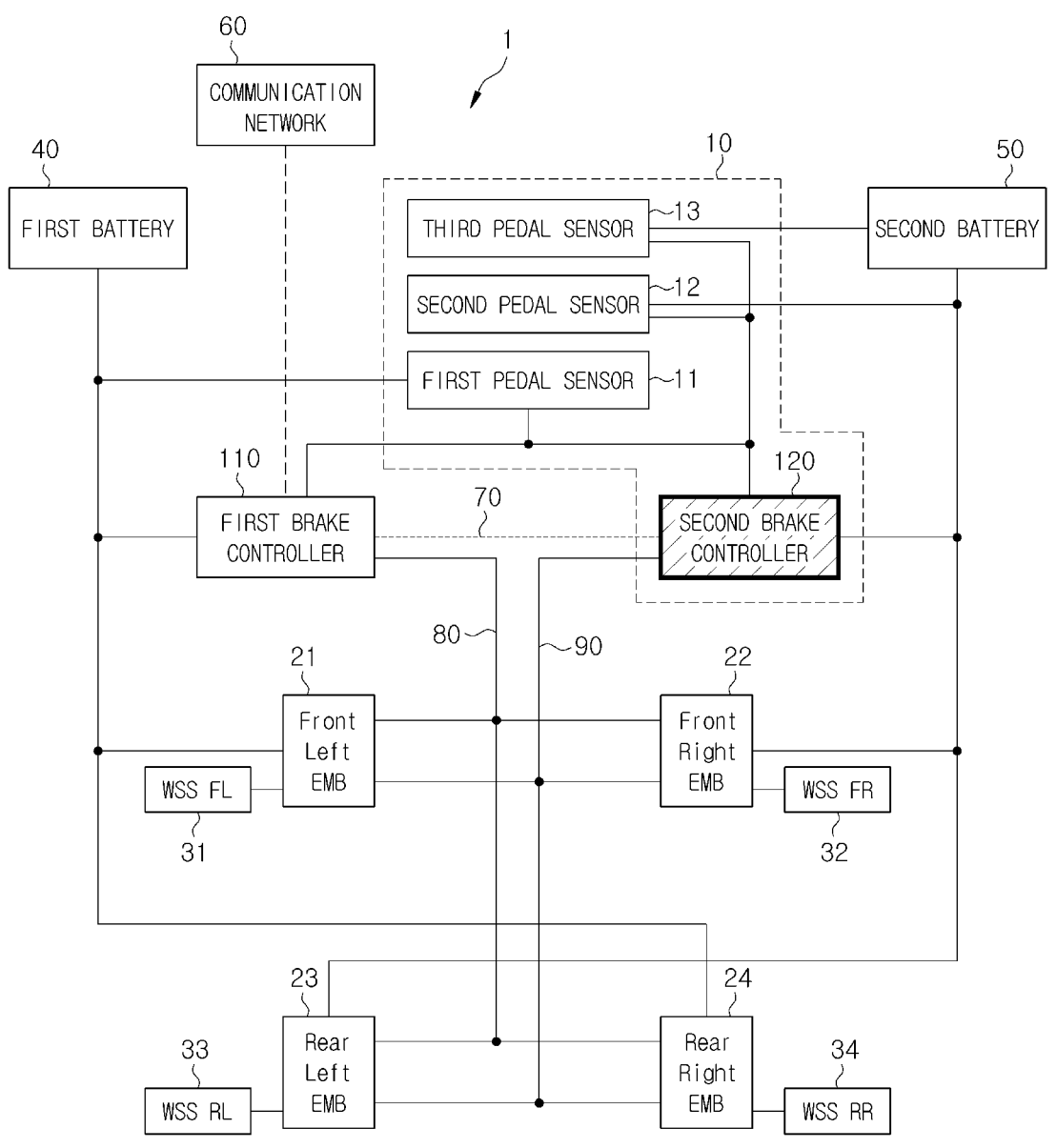
FIG. 6 shows a state in which a second brake controller has failed in the electro mechanical brake system of FIG. 1.

FIG. 6 shows a state in which the second brake controller 120 has failed in the electro mechanical brake system 1 of FIG. 1.

Referring to FIG. 6, a restriction that occurs when the second brake controller 120 has failed may be that a failure of any one of the first pedal sensor 11, the second pedal sensor 12, or the third pedal sensor 13 may not be detected. In this situation, the first brake controller 110, instead of the second brake controller 120, may obtain a first target braking torque based on a first braking signal and transmit the first target braking torque to the first EMB 21, the second EMB 22, the third EMB 23, and the fourth EMB 24.

In contrast, a restriction that occurs when the first brake controller 110 has failed may be that additional control functions, such as ABS, ESC, and TCS, may not be performed because the second brake controller 120 is not connected to the ECU in the vehicle through the communication network 60. In this situation, the second brake controller 120, instead of the first brake controller 110, may obtain a second target braking torque based on a first braking signal, a second braking signal, and a third braking signal, and transmit the second target braking torque to the first EMB 21, the second EMB 22, the third EMB 23, and the fourth EMB 24.

In summary, when the second brake controller 120 has failed, a normal braking control may be performed except that a failure of any one of the first pedal sensor 11, the second pedal sensor 12, or the third pedal sensor 13 may not be detected, and when the first brake controller 110 has failed, a normal braking control may be performed except that additional control functions, such as ABS, ESC, and TCS, may not be performed. Accordingly, when any one of the first brake controller 110 or the second brake controller 120 has failed, another one not failed may transmit a first target braking torque or a second target braking torque to the first EMB 21, the second EMB 22, the third EMB 23, and the fourth EMB 24, thereby performing a normal braking control.

Figure 7:
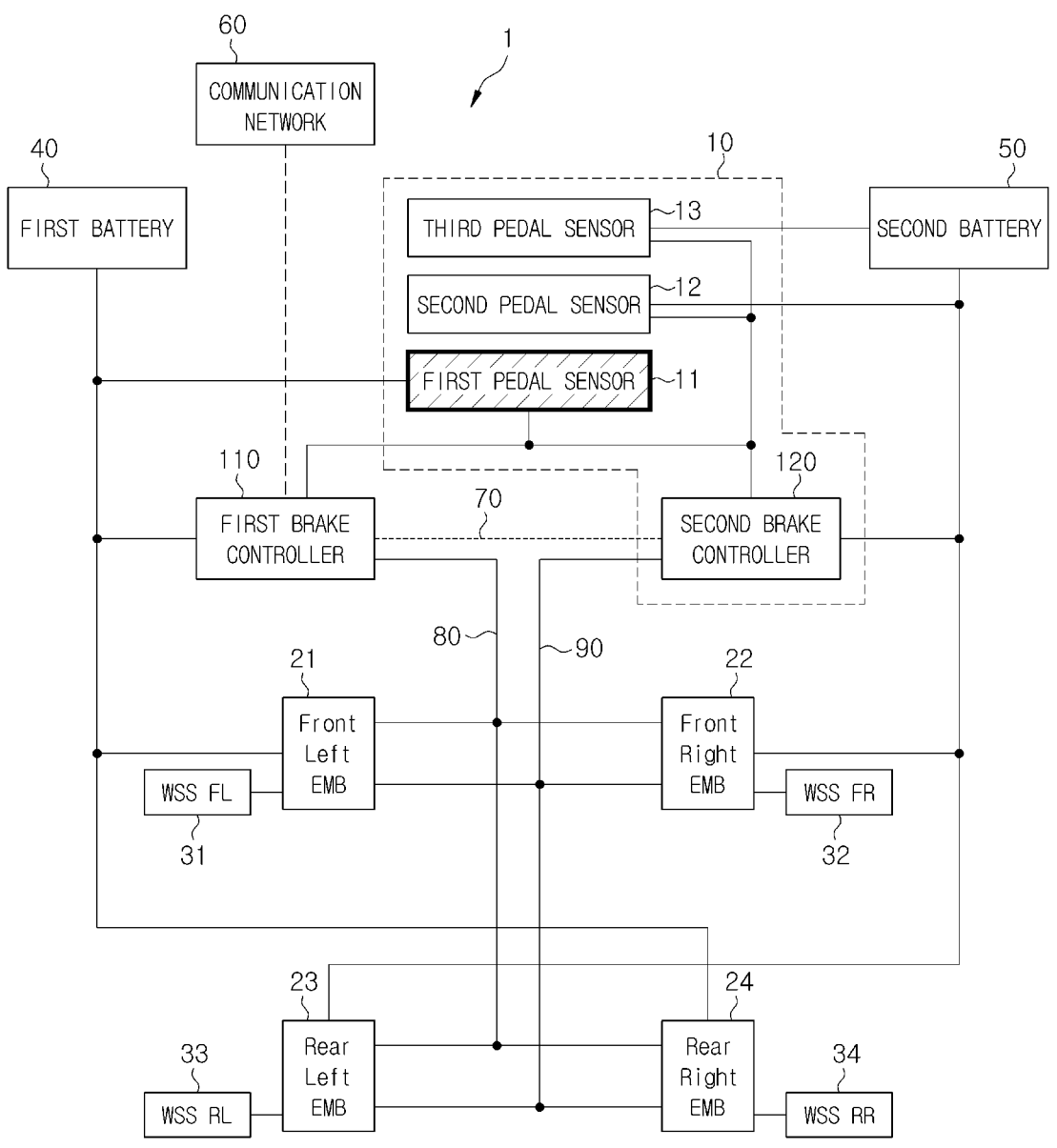
FIG. 7 shows a state in which a first pedal sensor has failed in the electro mechanical brake system of FIG. 1.

FIG. 7 shows a state in which the first pedal sensor 11 has failed in the electro mechanical brake system 1 of FIG. 1.

Referring to FIG. 7, the second brake controller 120 may detect a failure of at least one of the first pedal sensor 11, the second pedal sensor 12, or the third pedal sensor 13 based on a first braking signal, a second braking signal, and a third braking signal. When the second brake controller 120 detects a failure of the first pedal sensor 11, the second brake controller 120 may obtain a second target braking torque based on a second braking signal and a third braking signal. The second brake controller 120 may transmit a failure signal of the first pedal sensor 11 to the first brake controller 110. The first brake controller 110 which has received the failure signal of the first pedal sensor 11 may stop a calculation for obtaining a first target braking torque.

Meanwhile, the second brake controller 120 may transmit the second target braking torque to the first brake controller 110 or to the first EMB 21, the second EMB 22, the third EMB 23, and the fourth EMB 24. Any one of the above-described methods may be applied although a difference may be made according to the methods.

For example, when the second brake controller 120 transmits the second target braking torque to the first brake controller 110, the first brake controller 110 may transmit the second target braking torque to the first EMB 21, the second EMB 22, the third EMB 23, and the fourth EMB 24. Accordingly, the first brake controller 110 may function as a main brake controller and perform additional braking controls, such as ABS control, ESC control, and TCS control.

Figure 8:
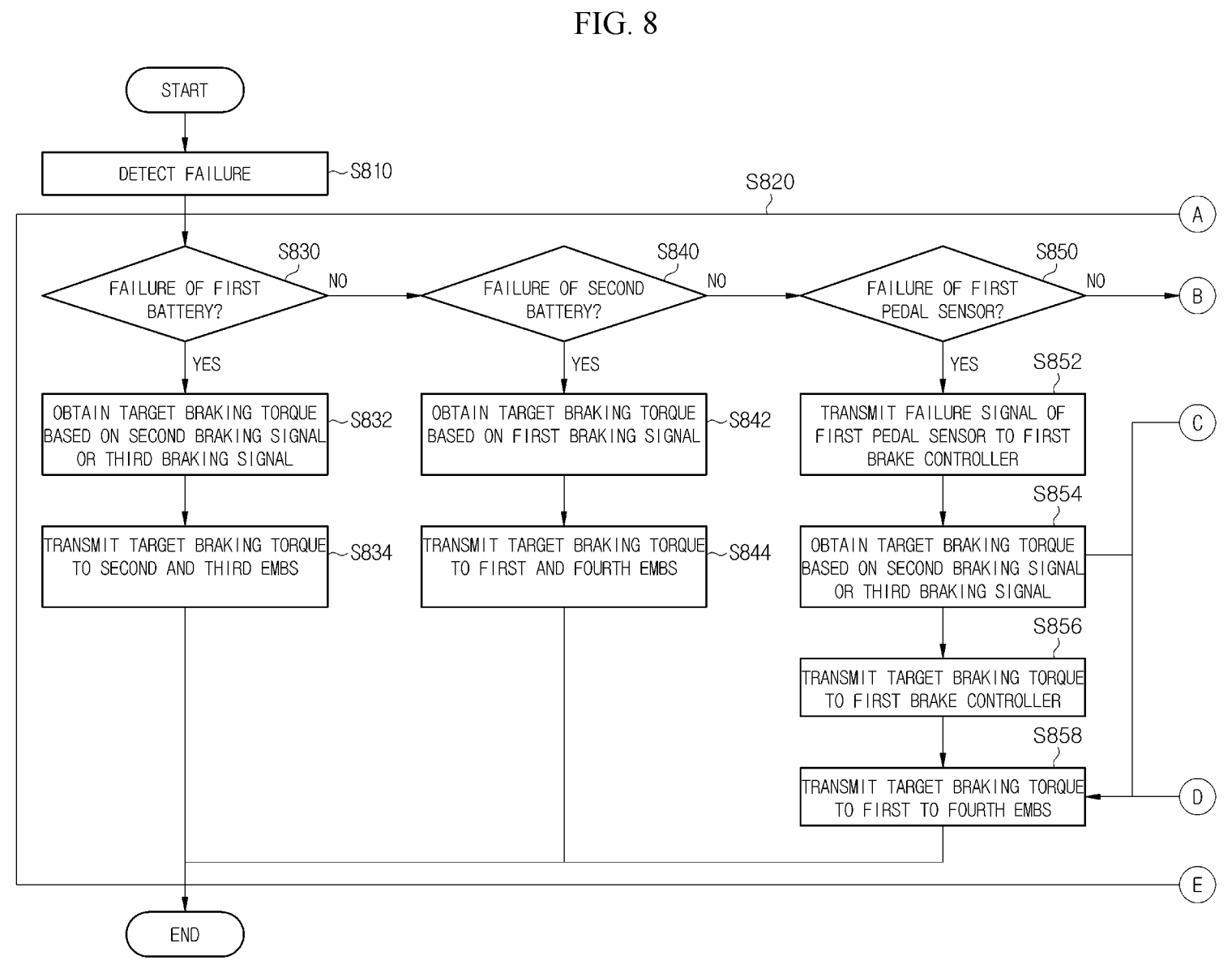
Figure 9:
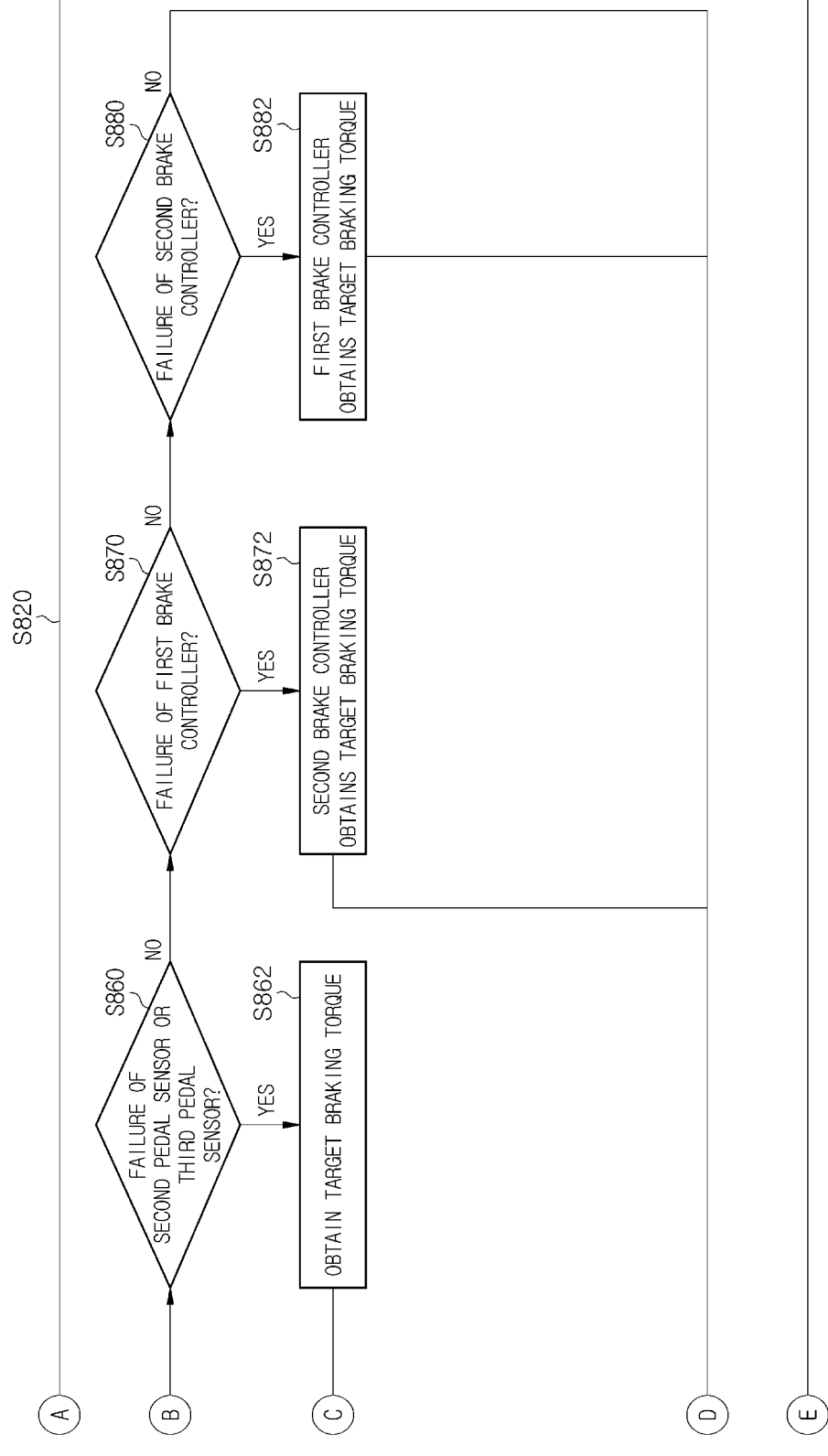
FIG. 9 is flowchart illustrating a method of controlling an electro mechanical brake system according to an embodiment.

When the second brake controller 120 transmits the second target torque to the first EMB 21, the second EMB 22, the third EMB 23, and the fourth EMB 24, the second brake controller 120 may function as a main brake controller, and perform a braking control more rapidly than the above-described method. FIG. 8 is flowchart illustrating a method of controlling an electro mechanical brake system according to an embodiment. FIG. 9 is flowchart illustrating a method of controlling an electro mechanical brake system according to an embodiment.

The electro mechanical brake system 1 may be the electro mechanical brake system 1 shown in FIG. 1. That is, the electro mechanical brake system 1 may include: the first pedal sensor 11, the second pedal sensor 12, and the third pedal sensor 13 configured to detect a pedal effort applied to the brake pedal and generate a first braking signal, a second braking signal, and a third braking signal; the first EMB 21, the second EMB 22, the third EMB 23, and the fourth EMB 24 installed in the respective wheels of the vehicle to provide a braking force; the first brake controller 110 connected to the first pedal sensor 11 and configured to obtain a first target braking torque based on the first braking signal and transmit the first target braking torque to the first EMB 21, the second EMB 22, the third EMB 23, and the fourth EMB 24; the second brake controller 120 connected to the first pedal sensor 11 to the third pedal sensor 13 and configured to obtain a second target braking torque based on the first braking signal, the second braking signal, and the third braking signal and transmit the second target braking torque to the first EMB 21, the second EMB 22, the third EMB 23, and the fourth EMB 24; the first battery 40 configured to supply power to the first pedal sensor 11, the first brake controller 110, the first EMB 21, and the fourth EMB 24; and the second battery 50 configured to supply power to the second pedal sensor 12, the third pedal sensor 13, the second brake controller 120, the second EMB 22, and the third EMB 23, wherein, when the first EMB 21, the second EMB 22, the third EMB 23, and the fourth EMB 24 receive both the first target braking torque and the second target braking torque, the first EMB 21, the second EMB 22, the third EMB 23, and the fourth EMB 24 may perform a braking control based on the first target braking torque.

The method of controlling the electro mechanical brake system 1 may include: operation 810 of detecting a failure of at least any one of the first battery 40, the second battery 50, the first pedal sensor 11, the second pedal sensor 12, the third pedal sensor 13, the first brake controller 110, or the second brake controller 120; and operation 820 of performing a braking control in any one of the first brake controller 110 or the second brake controller 120 in response to the detected failure.

In operation 810 of detecting a failure, a failure of the first battery 40 may be detected (830). In this case, operation 820 of performing a braking control may further include operation 832 of obtaining a second target braking torque based on a first braking signal, a second braking signal, and a third braking signal in the second brake controller 120, and operation 834 of transmitting the second target braking torque to the second EMB 22 and the third EMB 23.

In operation 810 of detecting a failure, a failure of the second battery 50 may be detected (840). In this case, operation 820 of performing a braking control may further include operation 842 of obtaining a first target braking torque based on a first braking signal in the first brake controller 110, and operation 844 of transmitting the first target braking torque to the first EMB 21 and the fourth EMB 24.

In operation 810 of detecting a failure, a failure of the first pedal sensor 11 may be detected (850). In this case, operation 820 of performing a braking control may further include operation 852 of transmitting a failure signal of the first pedal sensor 11 to the first brake controller 110 in the second brake controller 120, operation 854 of obtaining a second target braking torque based on a second braking signal and a third braking signal in the second brake controller 120, and operation 856 of transmitting the second target braking torque to the first brake controller 110 in the second brake controller 120, or operation 858 of transmitting the second target braking torque to the first EMB 21, the second EMB 22, the third EMB 23, and the fourth EMB 24 in the second brake controller 120.

Operation 820 of performing a braking control may further include operation 858 of transmitting, when the first brake controller 110 receives the second target braking torque, the second target braking torque to the first EMB 21, the second EMB 22, the third EMB 23, and the fourth EMB 24 in the first brake controller 110.

In operation 810 of detecting a failure, a failure of the second pedal sensor 12 or the third pedal sensor 13 may be detected (860). In this case, operation 820 of performing a braking control may further include: operation 862 of obtaining a first target braking torque and a second target braking torque based on sensor signals from the remaining pedal sensors not failed; and operation 858 of transmitting the first target braking torque and the second target braking torque to the first EMB 21, the second EMB 22, the third EMB 23, and the fourth EMB 24.

In operation 810 of detecting a failure, a failure of the first brake controller 110 may be detected (870). In this case, operation 820 of performing a braking control may further include: operation 872 of obtaining a second target braking torque in the second brake controller 120; and operation 858 of transmitting the second target braking torque to the first EMB 21, the second EMB 22, the third EMB 23, and the fourth EMB 24.

In operation 810 of detecting a failure, a failure of the second brake controller 120 may be detected (880). In this case, operation 820 of performing a braking control may further include: operation 882 of obtaining a first target braking torque in the first brake controller 110; and operation 858 of transmitting the first target braking torque to the first EMB 21, the second EMB 22, the third EMB 23, and the fourth EMB 24.

As described above, the electro mechanical brake system 1 may include the braking pedal unit 10 including the first pedal sensor 11, the second pedal sensor 12, the third pedal sensor 13, and the second brake controller 120, the first brake controller 110, the first battery 40, the second battery 50, the first EMB 21, the second EMB 22, the third EMB 23, and the fourth EMB 24, wherein the first battery 40 may be connected to the first pedal sensor 11, the first brake controller 110, the first EMB 21, and the fourth EMB 24 to supply power, the second battery 50 may be connected to the second pedal sensor 12, the third pedal sensor 13, the second brake controller 120, the second EMB 22, and the third EMB 23 to supply power, the first brake controller 110 may be connected to the first pedal sensor 11, the second brake controller 120, the first EMB 21, the second EMB 22, the third EMB 23, and the fourth EMB 24 through a wire and the communication network 60, the second brake controller 120 may be connected to the first pedal sensor 11, the second pedal sensor 12, the third pedal sensor 13, the first brake controller 10, the first EMB 21, the second EMB 22, the third EMB 23, and the fourth EMB 24 through a wire and the communication network 60, thereby implementing minimum braking performance required for an autonomous vehicle with low cost, even upon a breakdown or failure of some parts, which may generally occur in an autonomous driving situation.

According to an aspect of the disclosure, an electro mechanical brake system capable of providing minimum braking performance required for autonomous driving upon occurrence of a failure by ensuring redundancy of a pedal sensor, a battery, and a brake controller with a minimum configuration, and a method of controlling the electro mechanical brake system may be provided.

Accordingly, it may be possible to perform a braking control suitable for autonomous driving with minimum cost in various failure situations.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An electro mechanical brake system comprising:
a first pedal sensor, a second pedal sensor, and a third pedal sensor configured to detect a pedal effort applied to a brake pedal and generate a first braking signal, a second braking signal, and a third braking signal;
a first Electro Mechanical Brake (EMB), a second EMB, a third EMB, and a fourth EMB respectively installed in a plurality of wheels of a vehicle and configured to provide a braking force to the plurality of wheels of the vehicle;
a first brake controller connected to the first pedal sensor, and configured to obtain a first target braking torque based on the first braking signal and transmit the first target braking torque to the first EMB, the second EMB, the third EMB, and the fourth EMB, wherein the first brake controller is connected to an Electronic Controlled Unit (ECU) in the vehicle through a communication network, and configured to perform at least one control of Anti-lock Braking System (ABS) control, Electronic Stability Control (ESC) control, or Traction Control System (TCS) control; and
a second brake controller connected to the first pedal sensor, the second pedal sensor, and the third pedal sensor, and configured to obtain a second target braking torque based on the first braking signal, the second braking signal, and the third braking signal and transmit the second target braking torque to the first EMB, the second EMB, the third EMB, and the fourth EMB, wherein the second brake controller is configured to detect a failure of at least one of the first pedal sensor, the second pedal sensor, or the third pedal sensor based on the first braking signal, the second braking signal, and the third braking signal.

2. The electro mechanical brake system of claim 1, wherein, based on a failure of one brake controller of the first brake controller or the second brake controller, another brake controller not failed is configured to transmit the first target braking torque or the second target braking torque to the first EMB, the second EMB, the third EMB, and the fourth EMB.

3. The electro mechanical brake system of claim 1, wherein:
the first pedal sensor, the first brake controller, the first EMB, and the fourth EMB are powered from a first battery of the vehicle; and
the second pedal sensor, the third pedal sensor, the second brake controller, the second EMB, and the third EMB are powered from a second battery of the vehicle.

4. The electro mechanical brake system of claim 3, wherein, based on a failure of the first battery, the second brake controller is configured to obtain the second target braking torque based on the first braking signal, the second braking signal, and the third braking signal and transmit the second target braking torque to the second EMB and the third EMB.

5. The electro mechanical brake system of claim 3, wherein, based on a failure of the second battery, the second brake controller is configured to obtain the first target braking torque based on the first braking signal and transmit the first target braking torque to the first EMB and the fourth EMB.

6. The electro mechanical brake system of claim 1, wherein the first EMB, the second EMB, the third EMB, and the fourth EMB are configured to detect failures of a plurality of wheel speed sensors respectively installed in the plurality of wheels of the vehicle.

7. The electro mechanical brake system of claim 1, wherein the first EMB, the second EMB, the third EMB, and the fourth EMB are configured to receive a wheel speed signal from the plurality of wheel speed sensors respectively installed in the plurality of wheels of the vehicle and transmit the wheel speed signal to the first brake controller and the second brake controller.

8. The electro mechanical brake system of claim 7, wherein the first brake controller is configured to obtain the first target braking torque based on the first braking signal and the wheel speed signal, and the second brake controller is configured to obtain the second target braking torque based on the first braking signal, the second braking signal, the third braking signal, and the wheel speed signal.

9. The electro mechanical brake system of claim 1, wherein the first brake controller and the second brake controller are connected to a first local network, and the second brake controller is configured to obtain, upon a detection of a failure of the first pedal sensor, the second target braking torque based on the second braking signal and the third braking signal.

10. The electro mechanical brake system of claim 9, wherein the second brake controller is configured to transmit the second target braking torque to the first brake controller.

11. The electro mechanical brake system of claim 9, wherein the second brake controller is configured to transmit the second target braking torque to the first EMB, the second EMB, the third EMB, and the fourth EMB.

12. The electro mechanical brake system of claim 10, wherein the second brake controller is configured to transmit a failure signal of the second pedal sensor to the first brake controller, and the first brake controller is configured not to obtain the first target braking torque based on reception of the failure signal.

13. The electro mechanical brake system of claim 12, wherein the first brake controller is configured to transmit the second target braking torque to the first EMB, the second EMB, the third EMB, and the fourth EMB, based on reception of the second target braking torque.

14. The electro mechanical brake system of claim 1, wherein upon reception of both the first target braking torque and the second target braking torque, the first EMB, the second EMB, the third EMB, and the fourth EMB are configured to perform a braking control based on the first target braking torque.

15. A method of controlling an electro mechanical brake system of a vehicle including: a first pedal sensor, a second pedal sensor, a third pedal sensor, a first brake controller, a second brake controller, a first Electro Mechanical Brake (EMB), a second EMB, a third EMB, and a fourth EMB, wherein the first pedal sensor, the first brake controller, the first EMB, and the fourth EMB powered from a first battery of the vehicle and the second pedal sensor, the third pedal sensor, the second brake controller, the second EMB, and the third EMB are powered from a second battery of the vehicle, the method comprising:

at the first pedal sensor, detecting the second pedal sensor, and the third pedal sensor, a pedal effort applied to a brake pedal;

at the first pedal sensor, generating the second pedal sensor, and the third pedal sensor, a first braking signal, a second braking signal, and a third braking signal;

at the first brake controller connected to the first pedal sensor, obtaining a first target braking torque based on the first braking signal;

at the first brake controller transmitting the first target braking torque to the first EMB, the second EMB, the third EMB, and the fourth EMB;

at the first brake controller connected to an Electronic Controlled Unit (ECU) in the vehicle through a communication network, performing at least one control of Anti-lock Braking System (ABS) control, Electronic Stability Control (ESC) control, or Traction Control System (TCS) control;

at the second brake controller connected to the first pedal sensor, the second pedal sensor, and the third pedal sensor, obtaining a second target braking torque based on the first braking signal, the second braking signal, and the third braking signal;

at the second brake controller, transmitting the second target braking torque to the first EMB, the second EMB, the third EMB, and the fourth EMB;

at the first EMB, the second EMB, the third EMB, and the fourth EMB, performing a braking control based on the first target braking torque upon reception of both the first target braking torque and the second target braking torque;

detecting a failure of at least one of the first battery, the second battery, the first pedal sensor, the second pedal sensor, the third pedal sensor, the first brake controller, or the second brake controller; and at any one brake controller of the first brake controller or the second brake controller, performing a braking control based on the detected failure.

16. The method of claim 15, wherein, the performing of the braking control based on the detected failure comprises:

at the second brake controller, obtaining the second target braking torque based on the first braking signal, the second braking signal, and the third braking signal; and at the second brake controller, transmitting the second target braking torque to the second EMB and the third EMB.

17. The method of claim 15, wherein, the performing of the braking control based on the detected failure comprises:

at the first brake controller, obtaining the first target braking torque based on the first braking signal; and at the first brake controller, transmitting the first target braking torque to the first EMB and the fourth EMB.

18. The method of claim 15, wherein, the performing of the braking control obtaining comprises:

at the second brake controller, transmitting a failure signal of the first pedal sensor to the first brake controller;

at the second brake controller, obtaining the second target braking torque based on the second braking signal and the third braking signal; and at the second brake controller, transmitting the second target braking torque to the first brake controller or transmitting the second target braking torque to the first EMB, the second EMB, the third EMB, and the fourth EMB.

19. The method of claim 18, further comprising, at the first brake controller, transmitting, upon reception of the second target braking torque, the second target braking torque to the first EMB, the second EMB, the third EMB, and the fourth EMB.

* * * * *